July 6, 1948.  A. E. ELLIOTT  2,444,558

SERVICE HANDLE

Filed Dec. 7, 1945

Inventor:
Artemus E. Elliott,
by: *signature*
Attorney.

Patented July 6, 1948

2,444,558

UNITED STATES PATENT OFFICE 2,444,558

SERVICE HANDLE

Artemus E. Elliott, Pasadena, Calif.

Application December 7, 1945, Serial No. 633,567

2 Claims. (Cl. 224—57)

This invention relates to a service handle for use in carrying market bags, bundles and other articles having cord handles. Cord handles or other handles of a similar nature which are frequently employed for carrying articles of any considerable weight frequently tend to cut and abrade the hand of the user and are to this extent objectionable. The primary object of my invention is to provide a supplemental handle which can be easily and quickly applied to any conventional cord handle and which overcomes the above objections. Another object is the production of a supplemental handle grip of its kind which is simple, effective and inexpensive in construction and is designed so that it can be easily attached on any conventional cord handle and will remain attached under ordinary conditions or can be removed when desired and used on other articles. My improvement provides a handle grip which when attached to a cord handle will remain attached when the bundle or article to which it is applied is set down and not carried. This latter is a particular advantage.

Figure 1:
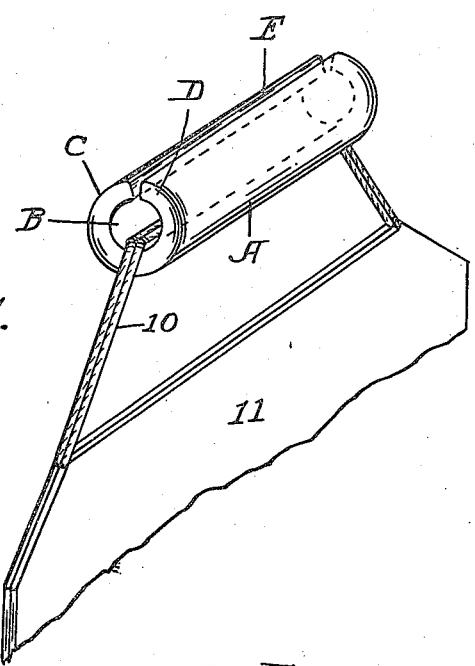
Figure 2:
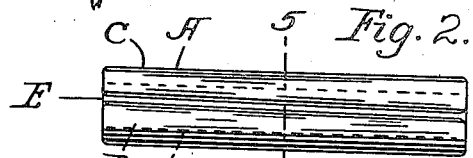
Figure 3:
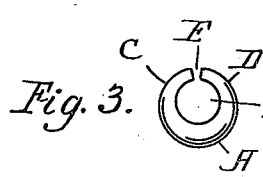
Figure 5:
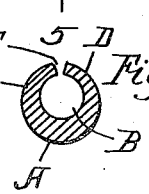
Figure 4:
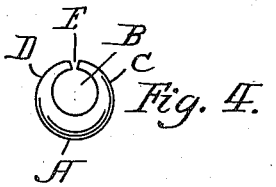

In the accompanying drawing, Fig. 1 is a perspective view of my improved handle grip which is shown applied to the cord handle of part of an ordinary market bag; Fig. 2 is a plan of my improved handle; Fig. 3 is an elevational view looking at one end of the handle as shown in Fig. 2; Fig. 4 is an elevational view looking at the opposite end of the handle grip from that which is shown in Fig. 3, and Fig. 5 is a cross section taken on the line 5—5 of Fig. 2.

My improved handle comprises a handle grip A of substantially outer cylindrical or other suitable shape and design having a bore or passage B extending longitudinally therethrough, the axis of the inner surface of the bore as shown being slightly eccentric to the axis of the outer surface so as to form a pair of resilient transverse arms C and D with a longitudinal slot E between their free ends. This slot is of restricted width whereby the handle cords 10 of a market bag 11 or other article or package must be forced to enter said bore in the handle grip as shown in Fig. 1. Thus the slot tends to retain the cord and assists in preventing the handle grip A from becoming unintentionally detached. The slot E extends longitudinally at a slight angle from end to end of the handle grip as clearly shown in Fig. 2. This tends additionally to prevent the handle grip from becoming unintentionally detached from the handle cord. Also the opposite side walls of slot E are disposed at an obtuse angle outwardly for additionally tending to obstruct the handle grip from becoming detached.

My improved handle grip is made out of any suitable substance such as wood, hard or soft rubber, metal, plastic or any other suitable material. In any event sufficient resilience is imparted to the handle grip so that the arm members C and D releasably retain the cord members such as 10 in normal cord holding position whereby the hand grip will not become detached.

My invention is extremely simple and inexpensive in construction and effective in use.

Modifications are contemplated within the spirit of the invention and within the scope of the following claims.

I claim:

1. A service handle for carrying articles having cord supports, comprising a handle grip having an inner longitudinal bore and a longitudinal cord admission slot entering said bore, said slot being disposed at a bias endwise from end to end of said handle grip.

2. A service handle for carrying articles having a cord support, comprising a handle grip body having a longitudinal transversely eccentric bore from end to end thereof, and a longitudinal cord admission slot entering said bore, the opposite side walls of said slot diverging outwardly to guide the cord into said bore, and said slot being disposed at a bias lengthwise from end to end of said handle grip and normally preventing the escape of the cord therefrom.

ARTEMUS E. ELLIOTT.

REFERENCES CITED

The following references are of record in the file of this patent:

UNITED STATES PATENTS

| Number | Name | Date |
| --- | --- | --- |
| 232,680 | Cammann | Sept. 28, 1880 |
| 480,618 | Palmer | Aug. 9, 1892 |
| 736,632 | Priddat | Aug. 18, 1903 |
| 743,945 | Soden | Nov. 10, 1903 |
| 1,460,354 | Carver | June 26, 1923 |
| 2,041,691 | Becklin | May 26, 1936 |

FOREIGN PATENTS

| Number | Country | Date |
| --- | --- | --- |
| 373,749 | Great Britain | June 2, 1932 |
| 722,397 | France | Dec. 29, 1931 |